United States Patent
Ueno (10) Patent No.: US 11,061,446 B1
(45) Date of Patent: Jul. 13, 2021

(54) ELECTRONIC DEVICE AND APPARATUS INCLUDING ELECTRONIC DEVICE

(71) Applicant: Panasonic Intellectual Property Management Co., Ltd., Osaka (JP)

(72) Inventor: Taku Ueno, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/739,629

(22) Filed: Jan. 10, 2020

(51) Int. Cl.
*G06F 1/16* (2006.01)
*H02G 11/02* (2006.01)

(52) U.S. Cl.
CPC .......... *G06F 1/1684* (2013.01); *G06F 1/1632* (2013.01); *H02G 11/02* (2013.01)

(58) Field of Classification Search
CPC .... G06F 1/1616; G06F 1/1626; G06F 1/1632; G06F 1/1656; H04M 1/0258; H04M 1/72527; H04M 1/0256; H04M 1/6066; H04R 1/04; B60R 11/0252; B60R 2011/0029; B60R 2011/0052; B60R 2011/0071; B60R 2011/0075
See application file for complete search history.

(56) References Cited

U.S. PATENT DOCUMENTS

| | | | | |
|---|---|---|---|---|
| 4,868,862 | A * | 9/1989 | Ryoichi | B60K 20/02 455/572 |
| 5,652,792 | A | 7/1997 | Gallagher et al. | |
| 6,119,837 | A * | 9/2000 | Tschurbanoff | B65H 75/425 191/12.2 A |
| 2003/0068986 | A1* | 4/2003 | Oh | B60R 11/0241 455/90.1 |

FOREIGN PATENT DOCUMENTS

| | | |
|---|---|---|
| JP | 9-261299 | 10/1997 |
| JP | 2006-333355 | 12/2006 |
| JP | 2007-13837 | 1/2007 |
| JP | 3953258 | 8/2007 |
| JP | 2013-12813 | 1/2013 |
| JP | 2016-136675 | 7/2016 |

* cited by examiner

*Primary Examiner* — Nelson M Rosario
(74) *Attorney, Agent, or Firm* — Wenderoth, Lind & Ponack, L.L.P.

(57) ABSTRACT

The handset is connected to a cord that can be unreeled and reeled in, and can be set in a cradle and taken out of the cradle, the handset comprising an acceleration sensor, a display unit, and a controller. The acceleration sensor detects movement of the handset in a first direction, which is a direction in which the handset is taken out of the cradle, and/or a second direction, which is a direction in which the handset is set in the cradle. The controller controls operation of the display unit, and disables the operation of the display unit while the acceleration sensor is detecting movement of the handset in the first direction or the second direction.

10 Claims, 9 Drawing Sheets

ELECTRONIC DEVICE AND APPARATUS INCLUDING ELECTRONIC DEVICE

BACKGROUND

Technical Field

The present disclosure relates to: an electronic device which is connected to a cord that can be unreeled and reeled in, and which can be set in and taken out of a cradle; and an apparatus including this electronic device.

Background Art

For example, U.S. Pat. No. 5,652,792 relates to a handset and a cradle capable of accommodating the handset. The handset is electrically connected to a cord wound around a cord reel such that the cord can be unreeled and reeled in.

BRIEF SUMMARY

When a user takes the handset out of the cradle or sets the handset in the cradle, there is a risk that the user will unintentionally touch or contact an operating part of the handset and cause erroneous operation of the handset.

The present disclosure provides an electronic device effective in preventing erroneous operation of the electronic device caused by unintentional contact of a user with an operating part of the electronic device, for example, when taking the electronic device out of a cradle or setting the electronic device in a cradle. The present disclosure also provides an apparatus including this electronic device.

An electronic device according to one aspect of the present disclosure is an electronic device which is connected to a cord that can be unreeled and reeled in, and which can be set in a cradle and taken out of the cradle, the electronic device comprising a first sensor, a display unit, and a controller. The first sensor is configured to detect movement of the electronic device in at least one of a first direction and a second direction. The first direction is a direction in which the electronic device is taken out of the cradle. The second direction is a direction in which the electronic device is set in the cradle. The controller is configured to control operation of the display unit. The controller is configured to disable the operation of the display unit while the first sensor is detecting movement of the electronic device in the first direction or the second direction.

An electronic device according to another aspect of the present disclosure is an electronic device which is connected to a cord that can be unreeled and reeled in, and which can be set in a cradle and taken out of the cradle, the electronic device comprising a sound acquisition unit, a display unit, and a controller. The sound acquisition unit is configured to acquire sounds. The controller is configured to control operation of the display unit. The sound acquisition unit is configured to detect a prescribed sound, which is a sound made when the cord is unreeled from the cradle or reeled in, from the sounds acquired by the sound acquisition unit, and configured to disable the operation of the display unit while detecting the prescribed sound.

DESCRIPTION OF THE PREFERRED EMBODIMENTS

Embodiments of the present disclosure will be described in detail while referencing the drawings. Note that, in some cases, unnecessarily detailed descriptions are foregone. For example, detailed descriptions of well-known matters and redundant descriptions of configurations and constituents that are substantially the same may be foregone.

Note that the following description and attached drawings are provided for the purpose of enabling a person skilled in the art to comprehend the present disclosure, and are not intended to limit the matters recited in the claims.

1. Embodiment 1

1-1. Configuration

1-1-1. Configuration of Apparatus 100

Figure 1:
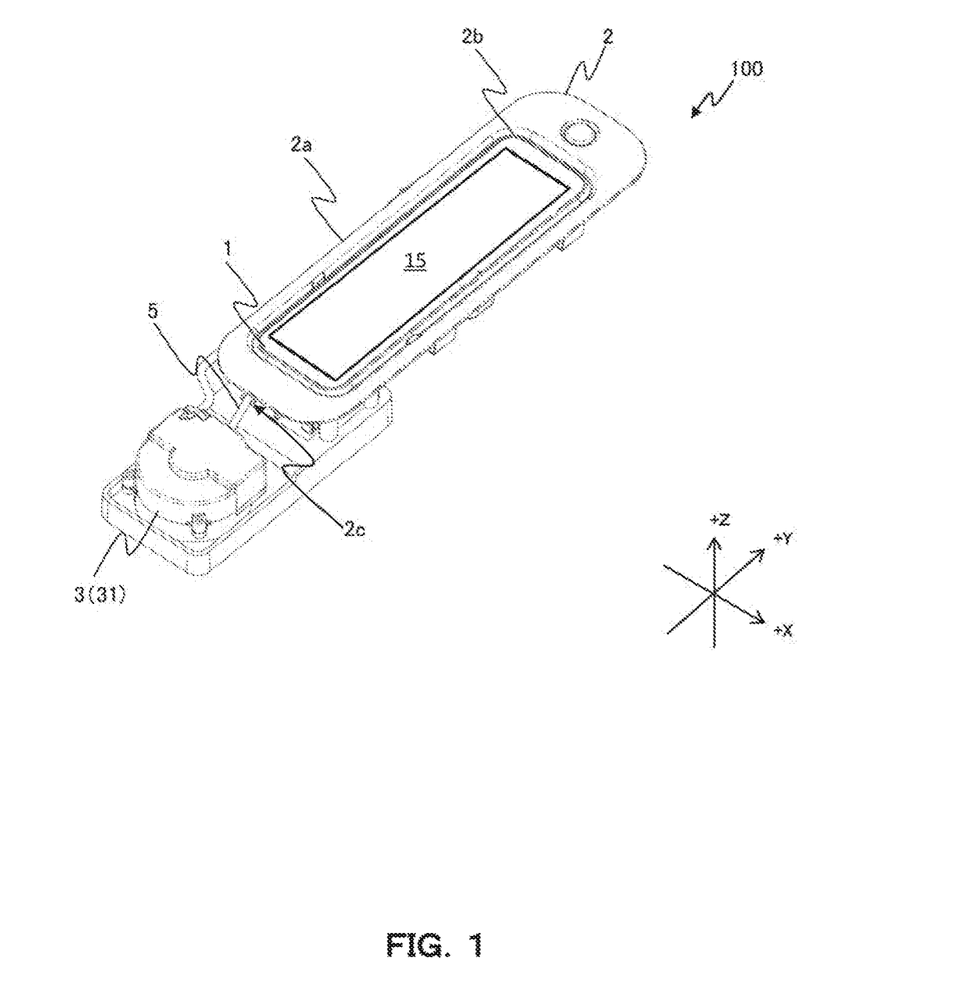
FIG. 1 is an external perspective view of an apparatus including a handset.

An apparatus 100 shown in FIG. 1 includes a handset 1 (one example of an electronic device), a cradle 2, and a cord reel 3. The apparatus 100 is installed in, for example, a seat of an aircraft. A passenger, crewman, etc. (referred to as a user below), of the aircraft can receive or provide various in-cabin services by taking the handset 1 out of the cradle 2 and operating the handset 1.

The handset 1 is set in the cradle 2 so as to be capable of being taken out. The handset 1 has a display unit 15 including a touch panel, as is described hereinafter. The handset 1 is electrically connected via a cord 5 to another electronic device and/or a power source (neither are illustrated). The cord 5 is wound on the cord reel 3.

Figure 2:
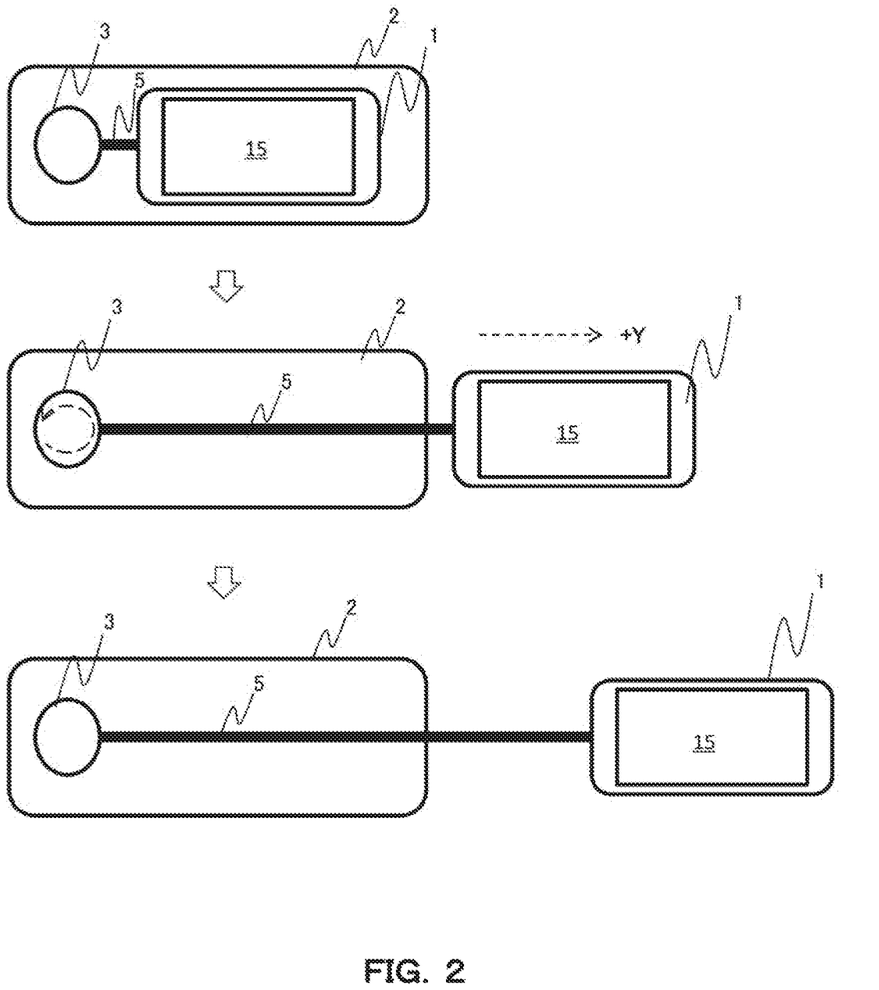
FIG. 2 is a diagram for describing an action when the handset is taken out of a cradle.
Figure 3:
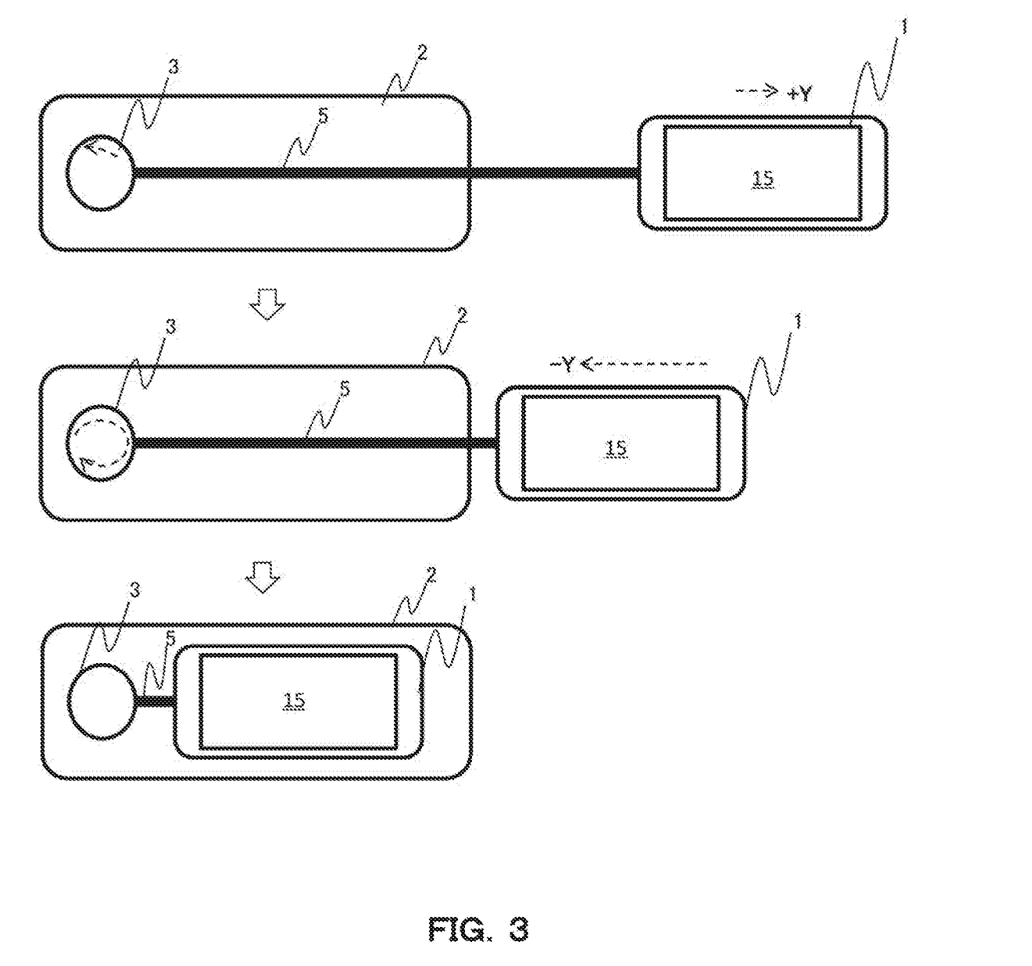
FIG. 3 is a diagram for describing an action when the handset is set in the cradle.

The user can take the handset 1 out of the cradle 2 and use the handset 1. When the user takes the handset 1 out of the cradle 2 and pulls the handset 1 in a +Y direction, the cord 5 is unreeled from the cord reel 3, as shown in FIG. 2. Thus, the user can move the handset 1 to a desired position. In the case of returning the handset 1 to the cradle 2, when the user slightly pulls the handset 1 in the +Y direction, the cord 5 which had been locked by a control mechanism of the cord reel 3 (described hereinafter) is reeled in, and the handset 1 also moves in a −Y direction, as shown in FIG. 3. As a result, the user can set the handset 1 in the cradle 2.

As described above, when the handset 1 is used, the handset 1 is taken out of the cradle 2 or set in the cradle 2. At this time, there is a risk that the handset 1 will erroneously operate due to the user touching or contacting the display unit 15 including the touch panel of the handset 1. When the handset 1 according to the present disclosure is taken out of the cradle 2 or set in the cradle 2, the handset 1 is prevented from being mistakenly operated. The handset 1 according to Embodiment 1 and the apparatus 100 including the handset 1 are described in detail below.

1-1-2. Configuration of Cradle 2

The cradle 2 includes a main body part 2a, an accommodating part 2b that accommodates the handset 1, and a cord insertion part 2c, as shown in FIG. 1. The accommodating part 2b is formed in the main body part 2a, and the accommodating part 2b has a shape capable of accommodating the entire length of handset 1. The cord 5, which connects the cord reel 3 and the handset 1 together, is inserted through the cord insertion part 2c.

1-1-3. Configuration of Cord Reel 3

Figure 4:
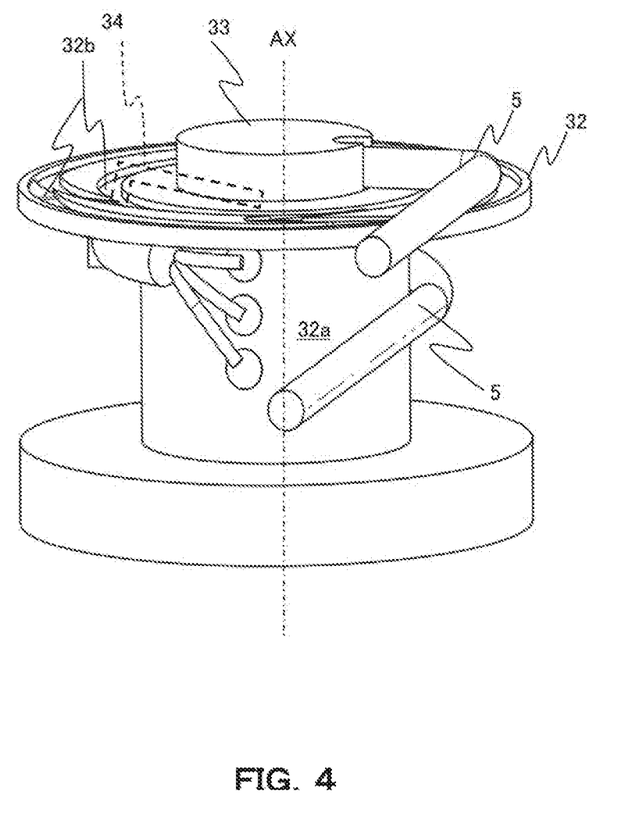
FIG. 4 is a perspective view of an interior of a cord reel according to Embodiment 1.

FIG. 4 is a perspective view of an interior of the cord reel 3. The cord reel 3 is an apparatus that winds the cord 5 such that the cord 5 can be unreeled and reeled in, and the cord reel 3 includes a casing 31 (FIG. 1), a reel body 32, and a support prop 33. The casing 31 accommodates the reel body 32. The reel body 32 rotates within the casing 31 about a rotational axis AX. The reel body 32 includes a reel main body part 32a on which the cord 5 can be wound. The reel body 32 is urged in a direction of reeling the cord 5 in (a direction of forward rotation) by a spring (not shown) or another urging means. The cord 5 is wound on the reel body 32, one end of the cord is connected to one end of the handset 1, and another end of the cord is connected to another electronic device and/or a power source via a signal line (not shown) inside the reel body 32.

The cord reel 3 further has a control mechanism that controls the unreeling and reeling in of the cord 5. The control mechanism includes a groove 32b formed in a prescribed shape in the top of the reel body 32, and a sensor member 34 having a protrusion capable of sliding within the groove 32b. The protrusion of the sensor member 34 moves over the groove 32b as the reel body 32 rotates, and catches in a prescribed position by a curve, level difference, and/or incline formed in the groove 32b, locking the rotation of the reel body 32.

While the reel body 32 is rotating in reverse due to the unreeling action of the cord 5, the protrusion of the sensor member 34 moves over the groove 32b. When the unreeling action is stopped, the reel body 32 rotates forward due to the urging force of the spring, and the cord 5 is reeled in. At this time, the protrusion of the sensor member 34 catches in a prescribed position by a curve, level difference, and/or incline formed in the groove 32b, whereby the forward rotation of the reel body 32 is locked, and the reeling in of the cord 5 also stops. Due to this action, a desired length of the cord 5 can be unreeled, and the user can move the handset 1 to the desired position. When the cord 5 is unreeled a small amount and the reel body 32 is rotated in reverse, the protrusion of the sensor member 34 moves through the groove 32b in accordance with the shape of the groove 32b. When the protrusion reaches a prescribed position in the groove 32b in which movement is not limited, the locking of the rotation of the reel body 32 is released. As a result, the reel body 32 rotates forward due to the urging force of the spring, and the cord 5 is reeled in and wound on the reel body 32. Due to this action, the handset 1 moves to a position to be set in the cradle 2.

1-1-4. Configuration of Handset 1

Figure 5:
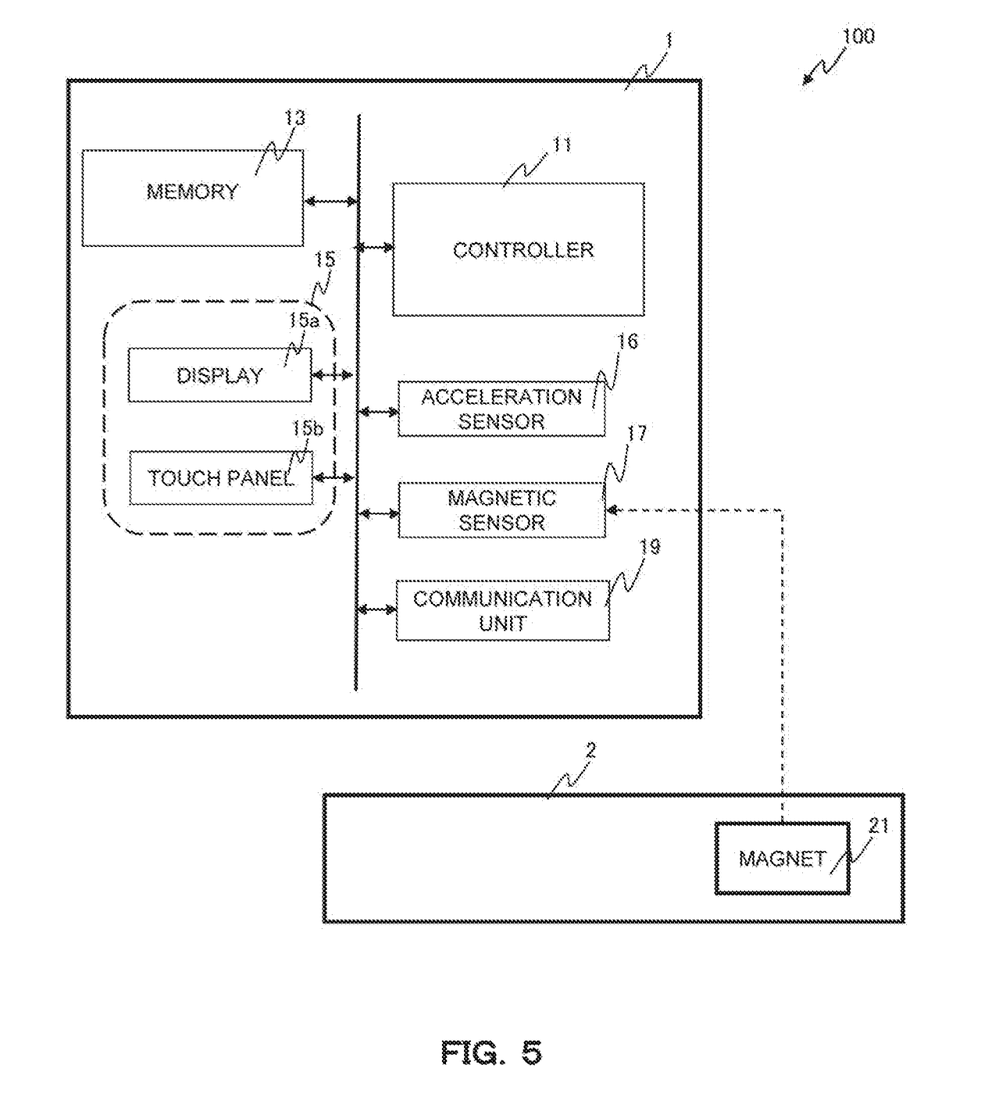
FIG. 5 is a configuration diagram of a handset according to Embodiment 1.

The handset 1 includes a controller 11, a memory 13, a display unit 15 including a display 15a and a touch panel 15b, an acceleration sensor 16, a magnetic sensor 17, and a communication unit 19.

The controller 11 (one example of a controller) includes circuitry configured to execute functions of the handset 1. The controller 11 is a calculation processing apparatus and a control apparatus configured to execute various programs, and the controller 11 controls all actions of the handset 1. In addition to launching and executing applications for animations and/or games, the controller 11 controls what is displayed on the display 15a of the display unit 15, and executes an erroneous operation prevention control, described hereinafter. In the erroneous operation prevention control, the controller 11 disables or enables the touch panel 15b. The touch panel 15b being disabled means that the touch panel 15b is put by the controller 11 into a state of not receiving input. At this time, the handset 1 does not react even if the user touches or contacts the touch panel 15b. The touch panel 15b being enabled means that controller 11 enacts a state in which input is received via the touch panel 15b and the handset 1 can operate accordingly.

The memory 13 includes read only memory (ROM) that stores various parameters and various programs executed by the CPU 11, and random access memory (RAM) that stores calculation results, sensor values, and such other data. The memory 13 may also include a solid state drive (SDD), flash memory, or such other nonvolatile semiconductor storage device, a hard disc drive (HDD) or such other magnetic storage device, an optical storage device, a magneto-optical storage device, etc.

The display unit 15 has the display 15a which is an LCD, an organic EL display, or such other display, and the touch panel 15b configured to receive input operations of the handset 1.

Figure 6:
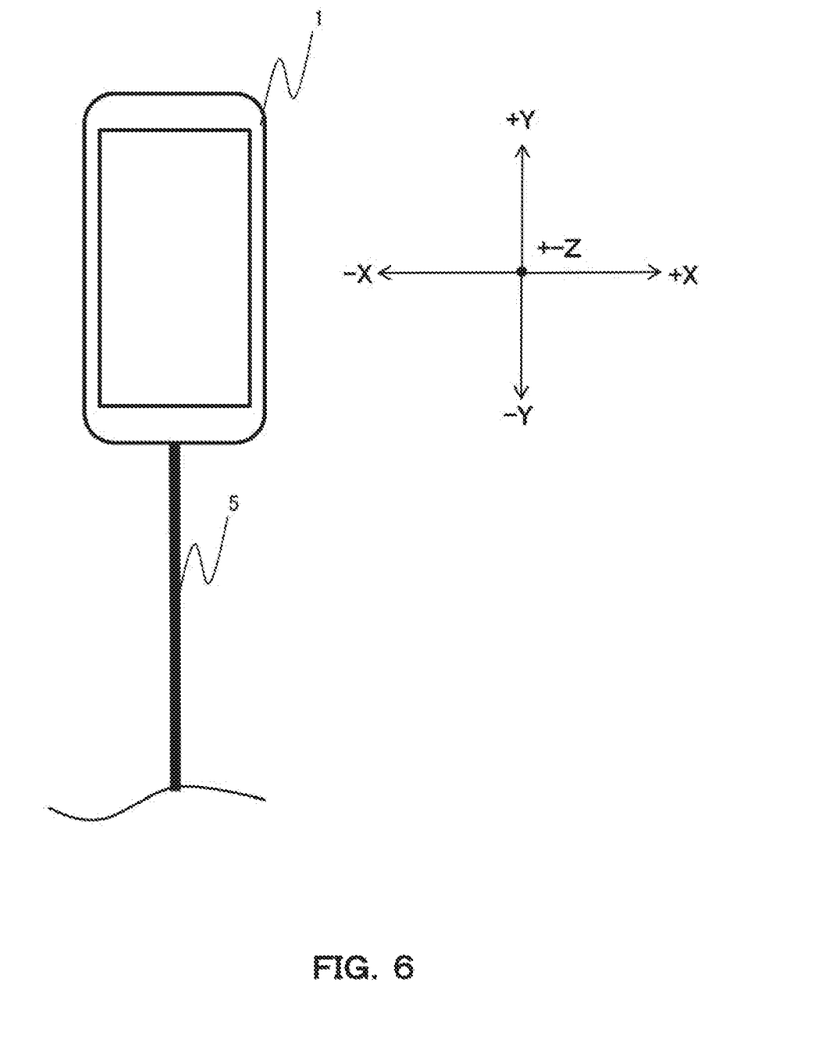
FIG. 6 is a diagram for describing a movement direction of the handset according to Embodiment 1.

The acceleration sensor 16 detects movement of the handset 1 (including movement direction and acceleration). The acceleration sensor 16 is, for example, a three-axis (three-dimensional) type that detects acceleration in an X-axis direction, a Y-axis direction, and a Z-axis direction, which are shown in FIG. 6. This example is not provided by way of limitation as to the type of the acceleration sensor 16. The acceleration sensor 16 may be, for example, a piezo resistive type, a capacitive type, or another type. In the erroneous operation prevention control (described hereinafter), on the basis of the movement direction and acceleration detected by the acceleration sensor 16, the controller 11 determines the movement of the handset 1 in the +Y and −Y directions shown in FIG. 6. In this embodiment, the +Y direction includes all directions in which components of the +Y direction are included. In other words, the direction may include a +X direction component, a +−Z direction component, and a −X direction component, provided that a +Y direction component is included. Similarly, the −Y direction includes all directions in which components of the −Y direction are included. In other words, the direction may include a +X direction component, a +−Z direction component, and a −X direction component, provided that a −Y direction component is included.

The magnetic sensor 17 detects magnetism from a magnet 21 placed in the cradle 2 as shown in FIG. 5. The magnetic sensor 17 detects a magnetic field of the magnet 21 when the handset 1 is set in the cradle 2. The controller 11 determines that the handset 1 has been set in the cradle 2 when a detection signal is received. On the other hand, the magnetic sensor 17 ceases to detect the magnetic field of the magnet 21 when the handset 1 is taken out of the cradle 2. The controller 11 determines that the handset 1 has been taken out of the cradle 2 when a detection signal is no longer received.

The communication unit 19 includes, for example, a network card, a network adapter, and/or other circuitry for communicating with other electronic devices. The communication unit 19 is configured to connect to other electronic devices via the cord 5.

1-2. Operation

Figure 7:
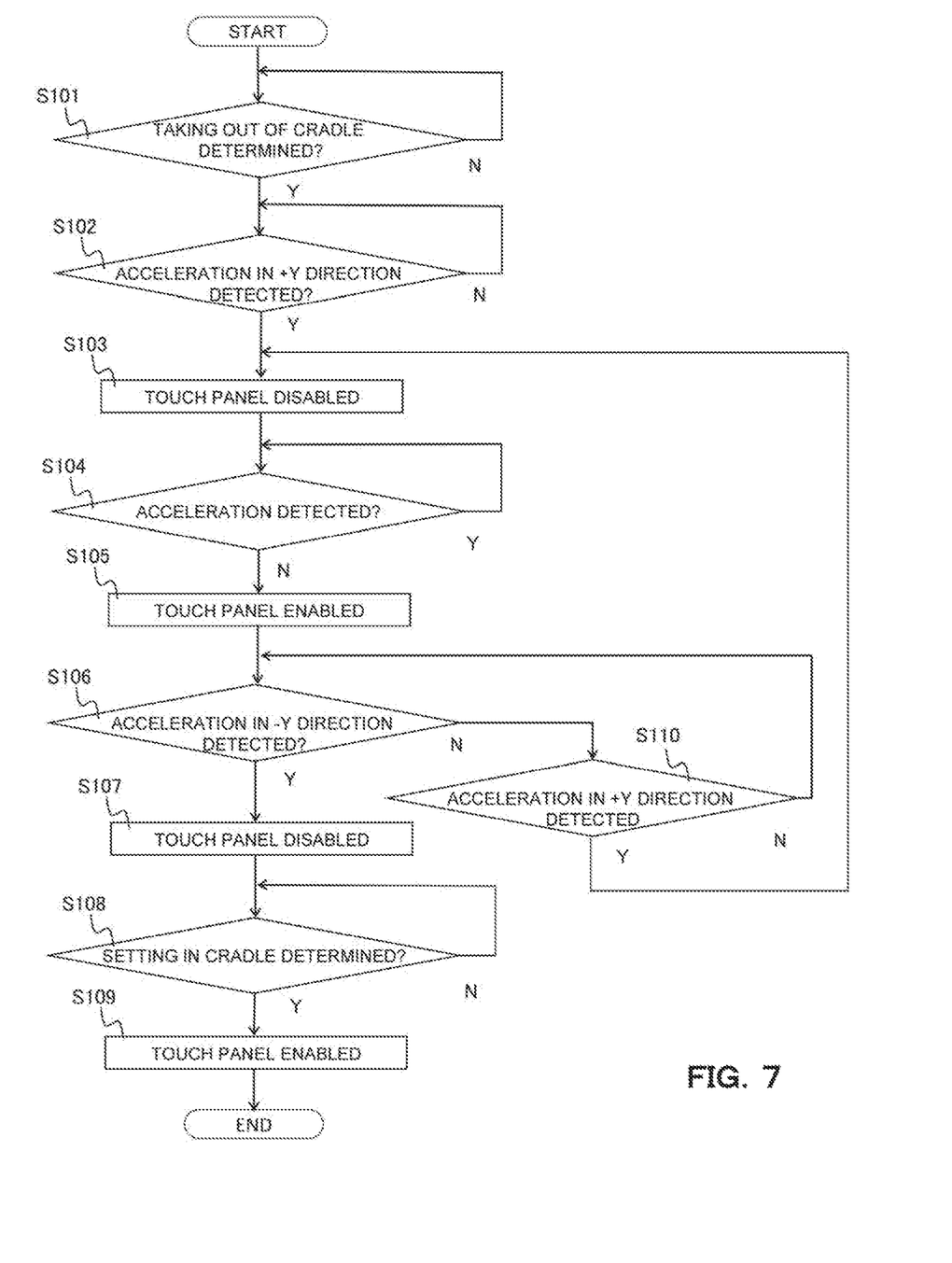
FIG. 7 is a flowchart showing the operation of the handset according to Embodiment 1.

An erroneous operation prevention control performed by the handset 1 shall be mainly described with reference to FIGS. 5 and 7. FIG. 7 shows a flow during which the handset 1 set in the cradle 2 is taken out of the cradle 2 in order to be used, and the handset 1 is again set in the cradle 2. With the handset 1 set in the cradle 2, a power source (not shown) is turned ON, the touch panel 15b is enabled, and input operations performed by the user are enabled.

When the handset 1 is taken out of the cradle 2, the magnetic sensor 17 ceases to detect the magnetic field of the magnet 21 of the cradle 2, and the controller 11 thereby determines that the handset 1 has been taken out (S101). When acceleration of the handset 1 in the +Y direction (FIG. 2) is detected by the acceleration sensor 16 (S102), the controller 11 disables the touch panel 15b (S103). At this point, the controller 11 determines that the handset 1 has begun moving in the +Y direction and disables the touch panel 15b. The handset 1 thereby does not react from when the user takes the handset 1 out of the cradle 2 until when the user has moved the handset 1 to a desired position in order to be used, even if the touch panel 15b is touched. Consequently, erroneous operation of the handset 1 can be prevented.

When acceleration of the handset 1 in the +Y direction (FIG. 2) is no longer detected by the acceleration sensor 16 (S104), the controller 11 enables the touch panel 15b (S105). At this point, the controller 11 determines that the movement of the handset 1 has ended and enables the touch panel 15b. Operations of the touch panel 15b are thereby enabled in response to the user having finished moving the handset 1 to a desired position.

When acceleration of the handset 1 in the −Y direction (FIG. 3) is detected by the acceleration sensor 16 (S106), the controller 11 disables the touch panel 15b (S107). At this point, the controller 11 determines in accordance with the acceleration detection that the handset 1 has begun moving in the −Y direction, and disables the touch panel 15b. The handset 1 thereby does not react while the user is moving the handset 1 in order to set the handset 1 in the cradle 2, even if the touch panel 15b is touched. Consequently, erroneous operation of the handset 1 can be prevented.

When the handset 1 is set in the cradle 2, the magnetic sensor 17 detects the magnetic field of the magnet 21 of the cradle 2, and the controller 11 thereby determines that the handset 1 has been set in the cradle 2 (S108) and enables the touch panel 15b (S109).

In step S106, when acceleration of the handset 1 in the −Y direction (FIG. 3) is not detected and acceleration in the +Y direction (FIG. 2) is detected (S110), i.e., when the user has further moved the handset 1 from the cradle 2 in order to use the handset 1, the process returns to step S103 and the touch panel is disabled.

As a modification of the actions described above, the determination in step S101 that the handset 1 has been taken out of the cradle 2 need not be performed. In other words, the controller 11 may disable the touch panel 15b in response to only the determination in step S102 that the handset 1 is moving in the +Y direction.

As another modification of the actions described above, the determination in step S108 that the handset 1 has been set in the cradle 2 need not be performed. Instead of this, the controller 11 may enable the touch panel 15b in step S109 in response to acceleration no longer being detected by the acceleration sensor 16.

1-3. Characteristics, etc.

In the handset 1 according to Embodiment 1, the acceleration sensor 16 detects acceleration of the handset 1 in the +Y direction, which is the direction in which the handset 1 is taken out of the cradle 2, and/or the −Y direction, which is the direction in which the handset 1 is set in the cradle 2. The controller controls the actions of the touch panel 15b and, while the acceleration sensor 16 is detecting the movement of the handset 1 in the +Y direction or the −Y direction, the controller disables the operation of the touch panel 15b.

Therefore, when the user takes the handset 1 out of the cradle 2 to use the handset 1, situations in which the user unintentionally touches or contacts the touch panel 15b of the handset 1 and erroneously operates the handset 1 can be prevented.

2. Embodiment 2

Embodiment 2 is described below. In the description below, descriptions of configurations and actions similar to those of Embodiment 1 are omitted.

2-1. Configuration A handset 201 according to Embodiment 2 differs from the handset 1 of Embodiment 1 in that movement of the handset 201 is determined by detecting, from sounds picked up by a microphone 18, a sound made when the cord 5 is unreeled from the cord reel 3 or reeled in.

Figure 8:
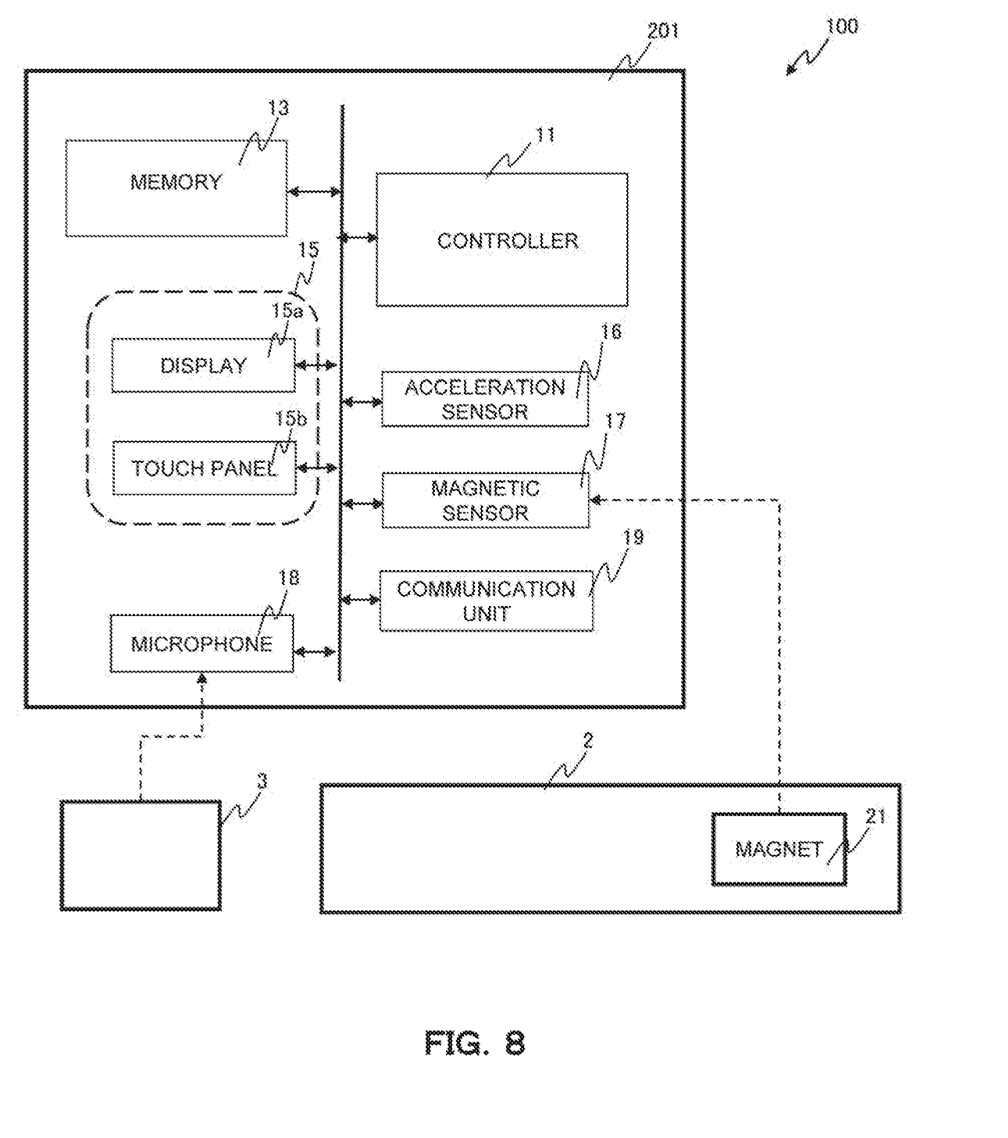
FIG. 8 is a configuration diagram of a handset according to Embodiment 2.

The handset 201 includes the microphone 18, as shown in FIG. 8. The microphone 18 (one example of a sound acquisition unit) acquires sounds in a periphery of the handset 201 and converts the sounds to electric signals. The controller 11 detects a prescribed sound among the acquired sounds. The prescribed sound is a reeling sound made when the cord 5 is unreeled from the cord reel 30 or reeled in. The reeling sound is, for example, a clicking sound produced by rotation of the cord reel 3. The controller 11 may, for example, preemptively store a waveform pattern equivalent to the reeling sound in the memory 13, and detect the reeling sound by comparing the waveform pattern with the sounds acquired from the microphone 18.

2-2. Operation

Figure 9:
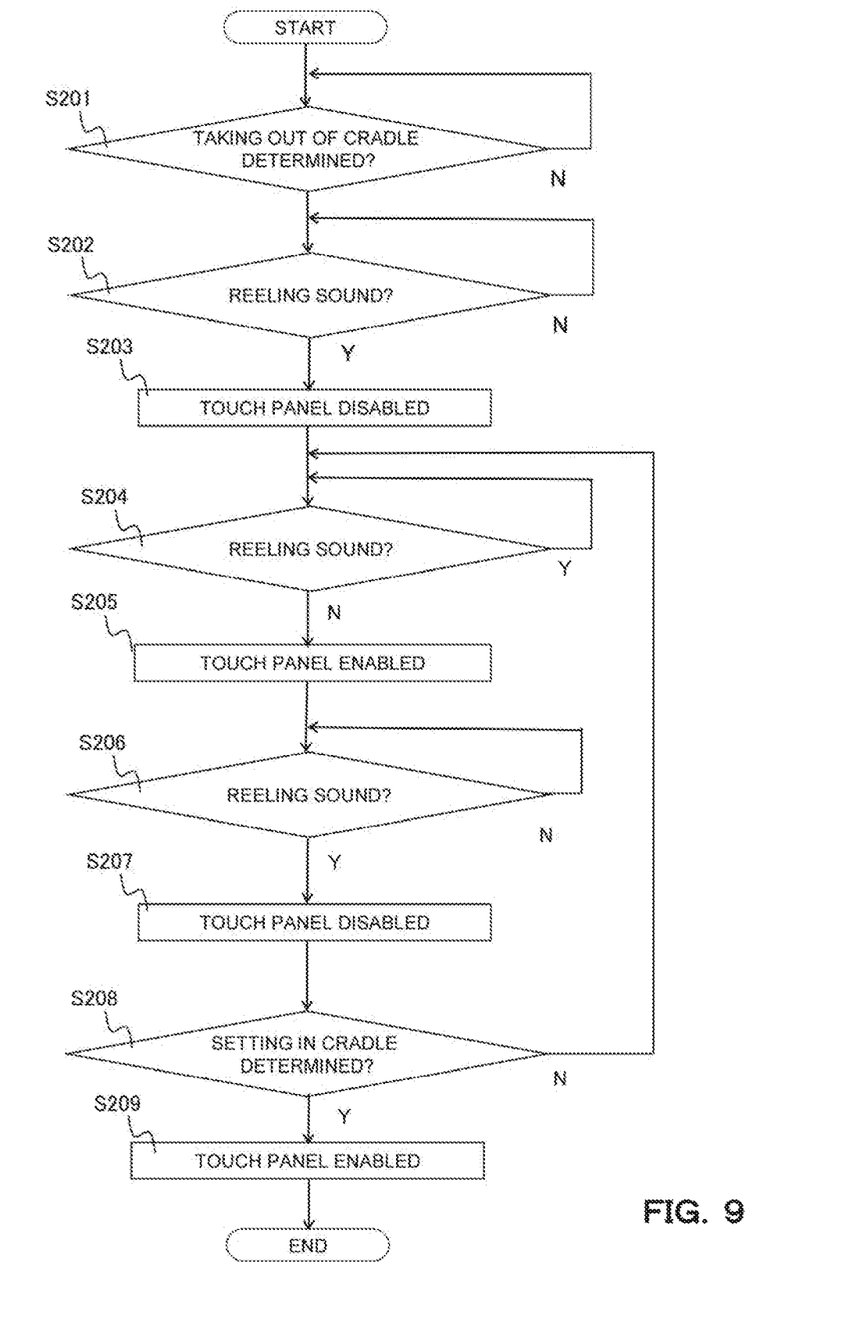
FIG. 9 is a flowchart showing the operation of the handset according to Embodiment 2.

An erroneous operation prevention control performed by the handset 201 shall be described with reference to FIGS. 8 and 9. FIG. 9 shows a flow during which the handset 201 set in the cradle 2 is taken out of the cradle 2 in order to be used, and the handset 201 is again set in the cradle 2. With the handset 201 set in the cradle 2, a power source (not shown) is turned ON, the touch panel 15b is enabled, and input operations performed by the user are enabled.

When the handset 201 is taken out of the cradle 2, the magnetic sensor 17 ceases to detect the magnetic field of the magnet 21 of the cradle 2, and the controller 11 thereby determines that the handset 201 has been taken out (S201). The controller 11 determines whether a reeling sound is included in the sounds picked up by the microphone 18 (S202), and in a case of detecting a reeling sound, the controller 11 disables the touch panel 15b (S203). The handset 201 thereby does not react from when the user takes the handset 201 out of the cradle 2 until when the user has moved the handset 201 to a desired position in order to be used, even if the touch panel 15b is touched. Consequently, erroneous operation of the handset 201 can be prevented.

Upon ceasing to detect a reeling sound from the sounds picked up by the microphone 18 (S204), the controller 11 enables the touch panel 15b (S205). Operation of the touch panel 15b is thereby enabled in response to the user having finished moving the handset 201 to a desired position.

Upon again detecting a reeling sound from the sounds picked up by the microphone 18 (S206), the controller 11 disables the touch panel 15b (S207). Therefore, the handset 201 does not react while the handset 201 is being moved in order to be set in the cradle 2 (or while the handset 201 is being further moved away from the cradle 2 in order to be used) even if the user touches the touch panel 15b. Consequently, erroneous operation of the handset 201 can be prevented.

When the handset 201 is set in the cradle 2, the magnetic sensor 17 detects the magnetic field of the magnet 21 of the cradle 2, whereby the controller 11 determines that the handset 201 has been set in the cradle 2 (S208) and enables the touch panel 15b (S209).

As a modification of the actions described above, the determination of the handset 201 being taken out of the cradle 2 in step S201 need not be performed. In other words, the controller 11 may disable the touch panel 15b in response to the start of a reeling sound detection in step S202.

As another modification of the actions described above, in addition to the reeling sound detection in step S202, the controller 11 may disable the touch panel 15b in step S203 by utilizing the acceleration sensor 16 and determining the movement of the handset 201 in the +Y direction, as in Embodiment 1.

As another modification of the actions described above, in addition to the absence of a reeling sound detection in step S204, the controller 11 may enable the touch panel 15b in step S205 in response to the absence of an acceleration detection made by the acceleration sensor 16, as in Embodiment 1.

As another modification of the actions described above, in addition to the detection of a reeling sound in step S206, the controller 11 may disable the touch panel 15b in step S207 by utilizing the acceleration sensor 16 and determining the movement of the handset 201 in the −Y direction (FIG. 3), as in Embodiment 1.

As another modification of the actions described above, the determination of the handset 201 being set in the cradle 2 in step S208 need not be performed. Instead, the controller 11 may enable the touch panel 15b in step S209 in response to the absence of a reeling sound detection. Instead of or in addition to this option, the controller 11 may enable the touch panel 15b in step S209 in response to the absence of a detection of acceleration of the handset 201.

2-3. Characteristics, Etc.

In the handset 201 according to Embodiment 2, the microphone 18 acquires sounds in the periphery of the handset 201, and the controller 11 controls the operation of the touch panel 15b, detects a reeling sound, which is a sound made when the cord 5 is unreeled from the cradle or reeled in, from the sounds acquired by the microphone 18, and disables the operation of the touch panel 15b while a reeling sound is being detected.

Therefore, as in Embodiment 1, when the user takes the handset 201 out of the cradle 2 to use the handset 201, situations in which the user unintentionally touches or contacts the touch panel 15b of the handset 201 and erroneously operates the handset 201 can be prevented.

3. Other Embodiments

While only selected exemplary embodiments have been chosen to illustrate the present disclosure, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present disclosure are provided for illustration only, and not for the purpose of limiting the invention as defined by the appended claims and their equivalents.

(1) In Embodiments 1 and 2, the touch panel 15b is disabled in response to the determination of movement of the handset 1, 201, but this example is not provided by way of limitation. In a case in which the handset 1, 201 is provided with an operation button or another operation unit, the controller 11 may disable input for this operation unit. The controller 11 may also disable the operation of the display 15a by turning off the display of information made by the display 15a (FIGS. 5 and 8), or by stopping the actions of applications during startup in the handset 1, 201.

(2) In Embodiments 1 and 2, the taking out of the handset 1, 201 from the cradle 2 and the setting of the handset 1, 201 in the cradle 2 may be detected by a pressure sensor or by the absence or presence of an electrical connection, instead of the detection performed by the magnetic sensor 17.

(3) In Embodiment 2, the controller 11 detects a reeling sound from the sounds acquired by the microphone 18, but this example is not provided by way of limitation. The controller 11 may detect a reeling sound on the basis of a vibration detected by the acceleration sensor 16. In this case, the controller 11 may, for example, preemptively store a vibration pattern equivalent to a reeling sound in the memory 13, and detect the reeling sound by comparing the vibration pattern with a vibration acquired by the acceleration sensor 16.

(4) The outward appearances and/or shapes of the handset 1, 201, the cradle 2, and the cord reel 3 according to Embodiments 1 and 2 are not limited to those shown in FIGS. 1 to 4. For example, the handset 1, 201 may be a vertically mounted type, which is accommodated in the cradle 20 in a vertical direction.

(5) In the above embodiments, the controller 11 may include, instead of the CPU or such other processor, a processor configured from a dedicated electronic circuit designed so as to carry out a prescribed function. Additionally, the processor may be configured from one or a plurality of processors. In the present specification, the term "apparatus" can also mean an assembly of a plurality of constituent elements (devices, modules (components), etc.), and all of the constituent elements may or may not be placed within the same casing. Whether a plurality of devices are accommodated in separate casings and connected via a network or one device includes a plurality of modules accommodated within one casing, both are cases that would be referred to as an apparatus.

(6) The flowcharts described above are not provided by way of limitation as to the flowcharts shown in FIGS. 7 and 9. As to the sequence of the processes, some of the processes may be substituted, or some of the processes may be executed in parallel.

(7) In addition to an aircraft, the apparatus 100 of the present disclosure may also be installed in a railroad, a bus, a ship, or another moving object or passenger moving object, or the apparatus may be installed in another facility.

General Interpretation of Terms

In understanding the scope of the present disclosure, the term "configured" as used herein to describe a component, section, or a part of a device includes hardware and/or software that is constructed and/or programmed to carry out the desired function.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including," "having," and their derivatives. Also, the terms "part," "section," "portion," "member," or "element" when used in the singular can have the dual meaning of a single part or a plurality of parts.

Terms that are expressed as "means-plus function" in the claims should include any structure that can be utilized to carry out the function of that part of the present disclosure. Finally, terms of degree such as "substantially," "about," and "approximately" as used herein mean a reasonable amount of deviation of the modified term such that the end result is not significantly changed. For example, these terms can be construed as including; a deviation of at least ±5% of the modified term if this deviation would not negate the meaning of the word it modifies.

What is claimed is:

1. An electronic device which is connected to a cord that can be unreeled and reeled in, and which can be set in a cradle and taken out of the cradle, the electronic device comprising:
    a first sensor configured to determine when the electronic device is set in the cradle;
    a second sensor configured (i) detect movement of the electronic device in a first direction, the first direction being a direction of movement of the electronic device away from the cradle, and (ii) detect movement of the electronic device in a second direction, the second direction being a direction of movement of the electronic device toward the cradle;
    a display unit; and
    a controller configured to control operation of the display unit, the controller being configured to
        (i) enable operation of the display unit when the first sensor determines that the electronic device is set in the cradle,
        (ii) disable the operation of the display unit when the first sensor determines that the electronic device is not set in the cradle and while the second sensor detects movement of the electronic device in the first direction, and
        (iii) disable the operation of the display unit when the first sensor determines that the electronic device is not set in the cradle and while the second sensor detects movement of the electronic device in the second direction.

2. The electronic device according to claim 1, wherein: the second sensor is configured to (i) as the movement of the electronic device in the first direction, detect acceleration of the movement in the first direction of the electronic device and (ii) as the movement of the electronic device in the second direction, detect acceleration of the movement in the second direction of the electronic device; and
    the controller is configured to
        (i) when the first sensor determines that the electronic device is not set in the cradle and when the operation of the display unit is enabled, disable the operation of the display unit in response to the second sensor detecting acceleration of the movement in the first direction,
        (ii) when the first sensor determines that the electronic device is not set in the cradle and when the operation of the display unit is disabled, enable the operation of the display unit in response to the second sensor ceasing to detect the acceleration of the movement in the first direction,
        (iii) when the first sensor determines that the electronic device is not set in the cradle and when the operation of the display unit is enabled, disable the operation of the display unit in response the second sensor detecting the acceleration of the movement in the second direction, and
        (iv) when the first sensor determines that the electronic device is set in the cradle and when the operation of the display unit is disabled, enable the operation of the display unit.

3. The electronic device according to claim 1, wherein disabling the operation of the display unit includes at least one of the following: making the display unit inactive in response to an input of an operation unit, turning off display of information made by the display unit, and stopping an action of an application during startup in the electronic device.

4. An apparatus comprising:
    the electronic device according to claim 1, to which one end of the cord is connected;
    a cradle in which and from which the electronic device can be set and taken out; and
    a cord reel which is placed between the other end of the cord and the cradle, and on which the cord is wound so as to be capable of being unreeled and reeled in.

5. An electronic device which is connected to a cord that can be unreeled and reeled in, and which can be set in a cradle and taken out of the cradle, the electronic device comprising:
    a first sensor configured to determine when the electronic device is set in the cradle;
    a sound acquisition unit configured to acquire sounds;
    a display unit; and
    a controller configured to control operation of the display unit, the controller being configured to
        (i) detect a prescribed sound from the sounds acquired by the sound acquisition unit, the prescribed sound being a sound made when the cord is unreeled from the cradle or reeled in,
        (ii) enable operation of the display unit when the first sensor determines that the electronic device is set in the cradle, and
        (iii) disable the operation of the display unit when the first sensor determines that the electronic device is not set in the cradle and when the prescribed sound is detected.

6. The electronic device according to claim 5, wherein disabling the operation of the display unit includes at least one of the following: making the display unit inactive in response to an input of an operation unit, turning off display of information made by the display unit, and stopping an action of an application during startup in the electronic device.

7. The electronic device according to claim 5, wherein the controller is configured to
(i) when the first sensor determines that the electronic device is not set in the cradle and when the operation of the display unit is enabled, disable the operation of the display unit in response to the prescribed sound being detected,
(ii) when the first sensor determines that the electronic device is not set in the cradle and when the operation of the display unit is disabled, enable the operation of the display unit in response to the prescribed sound ceasing to be detected, and
(iii) when the first sensor determines that the electronic device is set in the cradle and when the operation of the display unit is disabled, enable the operation of the display unit.

8. An apparatus comprising:
the electronic device according to claim 5, to which one end of the cord is connected;
a cradle in which and from which the electronic device can be set and taken out; and
a cord reel which is placed between the other end of the cord and the cradle, and on which the cord is wound so as to be capable of being unreeled and reeled in.

9. An electronic device which is connected to a cord that can be unreeled and reeled in, and which can be set in a cradle and taken out of the cradle, the electronic device comprising:
a first sensor configured to determine when the electronic device is set in the cradle;
a second sensor configured (i) detect movement of the electronic device in a first direction, the first direction being a direction of movement of the electronic device away from the cradle, and (ii) detect movement of the electronic device in a second direction, the second direction being a direction of movement of the electronic device toward the cradle;
a sound acquisition unit configured to acquire sounds;
a display unit; and
a controller configured to control operation of the display unit, the controller being configured to
(i) detect a prescribed sound from the sounds acquired by the sound acquisition unit, the prescribed sound being a sound made when the cord is unreeled from the cradle or reeled in,
(ii) enable operation of the display unit when the first sensor determines that the electronic device is set in the cradle,
(ii) disable the operation of the display unit when the first sensor determines that the electronic device is not set in the cradle and (a) while the second sensor detects movement of the electronic device in the first direction or (b) when the prescribed sound is detected, and
(iii) disable the operation of the display unit when the first sensor determines that the electronic device is not set in the cradle and (a) while the second sensor detects movement of the electronic device in the second direction or (b) when the prescribed sound is detected.

10. An apparatus comprising:
the electronic device according to claim 9, to which one end of the cord is connected;
a cradle in which and from which the electronic device can be set and taken out; and
a cord reel which is placed between the other end of the cord and the cradle, and on which the cord is wound so as to be capable of being unreeled and reeled in.

* * * * *